Figure 1:
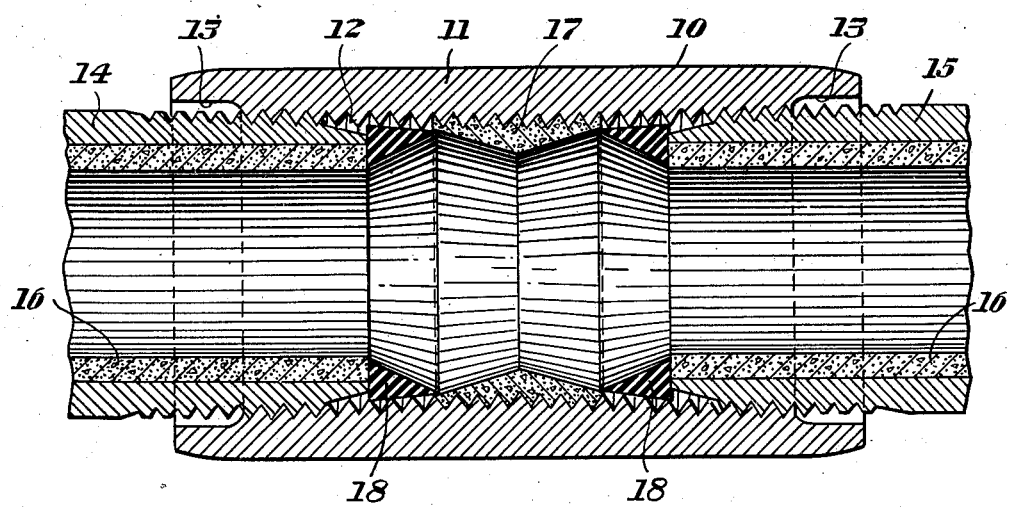

Feb. 1, 1944.   H. N. KEENER   2,340,537
COUPLING FOR LINED PIPE
Filed Nov. 20, 1942

INVENTOR
Howard N. Keener
by his attorneys
Stebbins and Blenko

Patented Feb. 1, 1944

2,340,537

UNITED STATES PATENT OFFICE 2,340,537

COUPLING FOR LINED PIPE

Howard N. Keener, Baden, Pa., assignor to Jones and Laughlin Steel Corporation, Pittsburgh, Pa., a corporation of Pennsylvania Application November 20, 1942, Serial No. 466,341

2 Claims. (Cl. 285—148)

This invention relates to a pipe coupling and, in particular, to a sleeve coupling specially adapted for pipe having corrosion-resistant lining therein.

Metal pipe having a corrosion-resistant lining has been known for many years. Various types of lining materials have been proposed such as glass, porcelain enamel or plastics but hydraulic cement is perhaps the material most widely used for lining pipe. While the various lining materials mentioned have excellent corrosion-resistance qualities and pipe lined therewith compete favorably with non-ferrous pipe such as brass, copper or lead pipe, lined pipe has not been used extensively, principally because of the lack of a satisfactory coupling for joining the ends of adjacent pipe lengths.

Various forms of couplings for lined pipe have been suggested but none of them, so far as I am aware, has been accepted as satisfactory for general use. The object sought in such couplings, of course, is to protect the interior thereof and the ends of the pipe from contact with the fluid traversing the pipe, despite variations in the extent to which the pipe lengths penetrate the coupling as a result of commercially permissible tolerances in respect to the diameter and threading of the pipe ends and coupling. This makes impractical the use of a coupling lining of fixed length which requires that the pipe ends abut firmly against it when screwed up. A similar difficulty is experienced if it is attempted to design a coupling so that the pipe ends when screwed up, firmly abut against each other. Obviously if the interior of the coupling is unprotected at any point, the advantage of using lined pipe is largely lost. Attempts have also been made to employ plastic compounds applied to the couplings as a lining in the field but satisfactory results are seldom obtained thereby, particularly if unskilled labor is relied on. Another form of coupling employs telescoping linings of corrosion resistant material but such linings proved weak mechanically and incapable of forming a fluid-tight seal.

I have invented a novel coupling specially adapted for lined pipe which insures that the interior of the coupling is fully protected against contact with the fluid traversing the pipe. At the same time, the coupling of my invention does not require any precise, predetermined relation between the pipe ends and the coupling. The interior of the coupling is protected regardless of whether the pipe ends have a minimum penetration into the coupling or penetrate therein substantially to the maximum possible extent.

Figure 2:
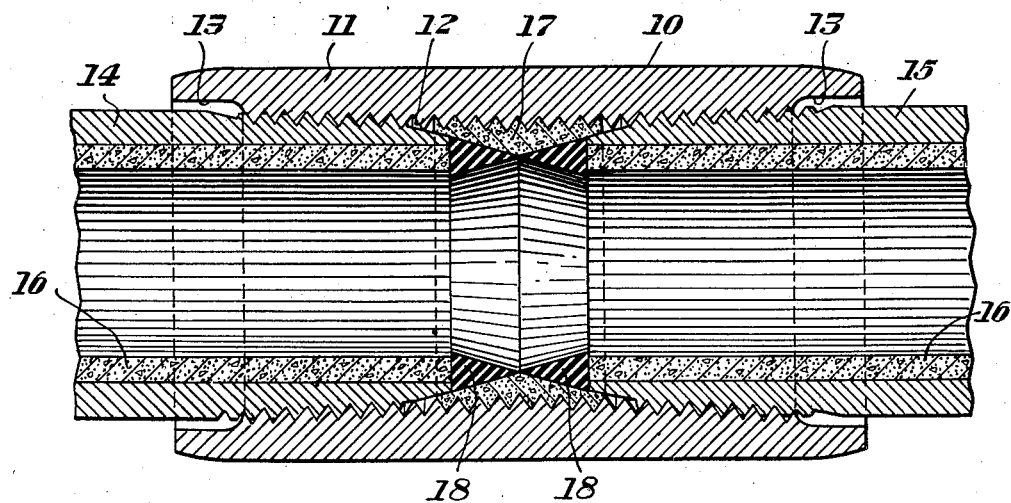

In a preferred embodiment, the coupling of my invention comprises a shell provided with a lining ring intermediate its ends, of hydraulic cement or other suitable material. The interior of the lining converges axially from both sides toward a central transverse plane, forming a double conical frustum. The ring feathers off in thickness toward each side. Sealing rings are inserted in each end of the coupling before the pipe ends are threaded therein. The sealing rings are dimensioned to slide within the lining ring in the coupling when forced axially thereinto by the advance of the pipe ends as they are screwed up. The sealing rings lap the lining ring of the coupling and overlie the portions of the interior of the coupling between the lining ring and the pipe ends. The sealing rings are compressed as they are forced into the lining ring but are held in sealing position by the pressure of the fluid traversing the pipe line. Further details, novel features and advantages of the invention will be explained during the following complete description of the invention referring to the accompanying drawing illustrating the preferred embodiment. In the drawing, Figure 1 is an axial section through a coupling according to my invention and the ends of the pipe lengths connected thereby, showing the relative positions of the pipe ends and coupling with minimum engagement of the threads thereof, and Figure 2 is a view similar to Figure 1 showing the relative positions of the pipe ends and coupling with the maximum engagement of their threads.

Referring now in detail to the drawing, the coupling of my invention indicated generally at 10 comprises a metallic sleeve or shell 11 of steel, for example, or other material having but limited corrosion resistance. The shell is bored axially and provided with an interior, tapered or pipe thread 12 extending interiorly from both ends to a point adjacent a median transverse plane. The extreme ends of the coupling are reamed at 13 in the known manner. The coupling is thus adapted to receive the threaded ends of adjacent lengths 14 and 15 of lined pipe. The pipe itself is composed of metal such as steel, the advantage of which is its low cost rather than its resistance to corrosion. Inside the pipe lengths, a corrosion-resistant lining 16 of cement or the like is applied, in the known manner, to protect the inner surface of the pipe lengths from contact with fluids flowing therethrough which might have a corrosive effect upon the metal of which the exterior of the pipe is composed.

In order to protect the interior of the coupling from contact with the fluids traversing the pipe line in which the pipe lengths 14 and 15 are connected, I provide the coupling with a lining ring 17 of hydraulic cement or the like disposed intermediate the ends of the coupling and preferably substantially centrally thereof. As clearly shown in the drawing, the interior of the ring 17 converges axially from both sides or ends toward the median transverse plane at which the ring has its minimum inside diameter. That is to say, the thickness of the ring 17 in section feathers off from a maximum at said median plane to substantially nothing at the ends or sides. The ring 17 may be formed in the coupling by known methods and apparatus for molding cement and is preferably finished to the contour shown by reaming, from opposite sides or ends. The interior of the ring 17, however, might be toroidal in shape, instead of the double conical frustum as shown but the latter is preferred because it may be formed by a simple reaming operation.

Sealing rings 18 of rubber or the like, either natural or artificial such as neoprene, are placed in each end of the coupling before the pipe ends are threaded thereinto. The rings are frusto-conical in contour, both exteriorly and interiorly, the section of the ring being of wedge-shape as illustrated. The rings 18 are dimensioned to fit snugly within the threaded interior of the coupling when positioned therein so that their thin edges slightly overlap the sides or ends of the ring 17 as shown in Figure 1.

As previously indicated, Figure 1 illustrates the relative positions of the pipe ends and coupling with the minimum engagement of their threads permissible under existing standards for a safe joint. It will be recognized, however, that because of permissible manufacturing tolerances, it will frequently be possible to screw the pipe ends further into the coupling before the desired frictional resistance to further screwing up is encountered. Under such conditions, the thin edges of the rings 18 penetrate further into the ring 17, sliding up on the feather edges of the latter as the pipe ends are screwed up. Because of the convergence of the interior of the ring 17 from both ends, the rings 18 are compressed both axially and circumferentially, thus increasing the pressure exerted thereby against the interior of the coupling and the ring 17 and improving the resulting seal.

It will be apparent that the rings 18 fully protect those portions of the interior of the coupling between the lining ring 17 and the pipe ends. The sealing off of these portions is aided by the pressure on the fluid traversing the pipe line which tends to urge the rings 18 against their seating surfaces, i. e., the interior of the coupling and the pipe ends.

Figure 2 illustrates the relative positions of the parts with maximum engagement of the threads of the coupling and pipe ends. It will be recognized that this is an unusual condition rather than the ordinary one. In fact, the same is true of Figure 1, since the dimensions of the pipe, the bore through the coupling and the extent of the threaded portion on the pipe ends will generally be intermediate the extreme permissible values. In other words, Figures 1 and 2 illustrate the extreme limiting conditions of minimum and maximum engagement of the threads, respectively, whereas the condition which is most frequently encountered in actual manufacture is somewhere between these extremes. Figures 1 and 2 serve, however, to illustrate that even under extreme conditions, the interior of the sleeve is fully protected against contact with the fluid flowing through the pipe line. Under the conditions of Figure 1 the protection is afforded jointly by the lining ring 17 and the sealing rings 18. Under the conditions of Figure 2, the lining rings 18 have been forced substantially into abutment at their thin edges. The taper of the lining ring 17 from both ends toward the median transverse plane permits this relatively wide variation between the extreme conditions encountered in practice, without impairing the protection afforded for the interior of the coupling.

It will be apparent that the invention provides a coupling for lined pipe characterized by numerous advantages. In the first place, my coupling is fully protected on the interior between relatively wide limits of maximum and minimum threaded engagement between the pipe ends and coupling and does not require that the pipe ends abut within the coupling nor that they have precise engagement with a seating shoulder at the exact instant when they have been tightened to the maximum degree. The ends of the pipe not covered by the lining thereof are also fully protected, regardless of the degree of engagement of the threads of the pipe ends and coupling. Since the interior of the coupling is fully protected, it has as great resistance to corrosion as the lined pipe itself. The sealing rings, furthermore, accommodate themselves to minor irregularities in the pipe ends. No plastic sealing or caulking material is required and the coupling is therefore simple, inexpensive, and easily installed so that it may be safely applied by unskilled labor.

The pressure inside the pipe line, furthermore, tends to seat the sealing rings the more firmly, thus preventing any accidental springing out of place or the like. Since the coupling engages the pipe ends by means of conventional threads, the operation of making up joints in a pipe line can be carried out rapidly.

Instead of applying the lining ring 17 directly over the threads on the interior of the coupling shell, the latter may be provided with an annular recess, if desired, to accommodate a lining of increased thickness.

Although I have illustrated and described but a preferred embodiment of the invention, it will be recognized that changes in the details of the several parts may be made without loss of the advantages mentioned.

I claim:

1. A fitting for use with pipe having a protective lining, comprising a metal sleeve threaded interiorly so as to receive a threaded pipe end therein, a lining ring in said sleeve spaced from the end thereof into which the pipe end extends, said ring having a frusto-conical interior flaring toward said end of the sleeve, and a sealing ring of readily distortable material disposed in said sleeve adapted to slide on said frusto-conical interior when engaged by the pipe end and be thereby forced into said lining ring, said sealing ring having a frusto-conical interior converging toward said end of the sleeve whereby the pressure of the fluid traversing the pipe exerts an axial component of force tending to seat the sealing ring firmly against the end of the pipe, as well as a radial component directed outwardly against the sleeve.

2. A coupling for joining pipe lengths having a protective lining therein, comprising a metal sleeve threaded interiorly so as to receive therein the threaded ends of said lengths, a lining ring in said sleeve spaced from the ends thereof and having its interior in the shape of a double conical frustum flaring toward both ends of the sleeve, and sealing rings of readily distortable material disposed in the end of said sleeve and adapted to slide on the interior of said double conical frustum when engaged by the pipe ends and be thereby forced into said lining ring, said sealing rings having a frusto-conical interior converging toward the adjacent end of the sleeve whereby the pressure of the fluid traversing the pipe exerts an axial component of force tending to seat the sealing ring firmly against the end of the pipe, as well as a radial component directed outwardly against the sleeve.

HOWARD N. KEENER.